US012732672B2

(12) United States Patent
Ng et al.

(10) Patent No.: US 12,732,672 B2
(45) Date of Patent: Sep. 8, 2026

(54) SYSTEMS, METHODS, AND DEVICES FOR GENERATION OF VIDEO CONTENT

(71) Applicant: Cypress Semiconductor Corporation, San Jose, CA (US)

(72) Inventors: Hung Pan Ng, Hong Kong (CN); Ying Xiong, Dalian (CN); Rongbin Qiu, Shanghai (CN)

(73) Assignee: Infineon Technologies Americas Corp., El Segundo, CA (US)

(*) Notice: Subject to any disclaimer, the term of this patent is extended or adjusted under 35 U.S.C. 154(b) by 0 days.

(21) Appl. No.: 18/893,625

(22) Filed: Sep. 23, 2024

(65) Prior Publication Data

US 2026/0089365 A1 Mar. 26, 2026

(51) Int. Cl.

*H04N 21/81* (2011.01)
*G02B 27/01* (2006.01)
*G06T 3/18* (2024.01)

(52) U.S. Cl.

CPC .......... *H04N 21/816* (2013.01); *G02B 27/01* (2013.01); *G06T 3/18* (2024.01)

(58) Field of Classification Search

CPC ......... H04N 21/816; G06T 3/18; G02B 27/01
See application file for complete search history.

(56) References Cited

U.S. PATENT DOCUMENTS

| | | | | |
|---|---|---|---|---|
| 7,307,635 | B1 * | 12/2007 | Yang | G09G 5/393 345/658 |
| 2022/0101487 | A1 * | 3/2022 | Akiba | G06T 5/80 |
| 2024/0311951 | A1 * | 9/2024 | Panneer | G06T 15/005 |

* cited by examiner

*Primary Examiner* — Lindsay J Uhl

(57) ABSTRACT

Systems, methods, and devices generate video data for graphics displays. Methods include receiving, at a video buffer, a video input comprising video data, the video data being included in a video frame, reading at least some of the video data out of the buffer based, at least in part, on a first offset value, and performing, using one or more processors, one or more graphics rendering operations on the video data. Methods also include writing rendered video data to a line buffer based, at least in part, on a second offset value, and generating a video output based, at least in part, on one or more warping operations, the video output being synchronous with the video input.

20 Claims, 8 Drawing Sheets

SYSTEMS, METHODS, AND DEVICES FOR GENERATION OF VIDEO CONTENT

TECHNICAL FIELD

This disclosure relates to graphics displays, and more specifically, to enhancement of generation of such video content for such graphics displays.

BACKGROUND

Graphics displays may be used to display video content generated by processors, graphics controllers, and memory. Such graphics displays may be implemented in a variety of environments, such as an automotive environment, in which warping operations may be performed to compensate for warping that may occur due to reflections off of surfaces of an automobile. Accordingly, processing operations may be performed to implement warping operations to accomplish such compensation. Conventional techniques for implementing such warping operations remain limited because they require a relatively large amount of processing resources and may experience other artifacts, such as screen tearing.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Graphics controllers and processors may be configured to generate video content for display on display devices. In some contexts, additional processing operations may be performed to configure the video content to compensate for optical distortions resulting from features of the display device as implemented in a viewing environment. Moreover, such graphics controllers and processors may be implemented in a processing environment in which relatively low power operation is preferred. Conventional techniques for implementing such graphics controllers and processors remain limited because they are not able to achieve such low power operation while also maintaining low output latency for video content. Accordingly, conventional techniques may experience errors and artifacts in the video output, such as screen tearing.

Embodiments disclosed herein provide generation of video content while maintaining low latency and relatively low resource usage. More specifically, warping operations may be performed for the generation of video content while in a low-memory usage capture-to-display mode. As will be discussed in greater detail below, a single video buffer may be used for visual data, and timings of read and write operations may be managed to ensure that a timing of a video output is synchronized to a timing of a video input, and a latency that is within a video frame is maintained. Accordingly, embodiments disclosed herein provide reduced resource usage by using a single video buffer, and enable the implementation of warping operations, even when in a low-memory mode, such as a capture-to-display mode.

Figure 1:
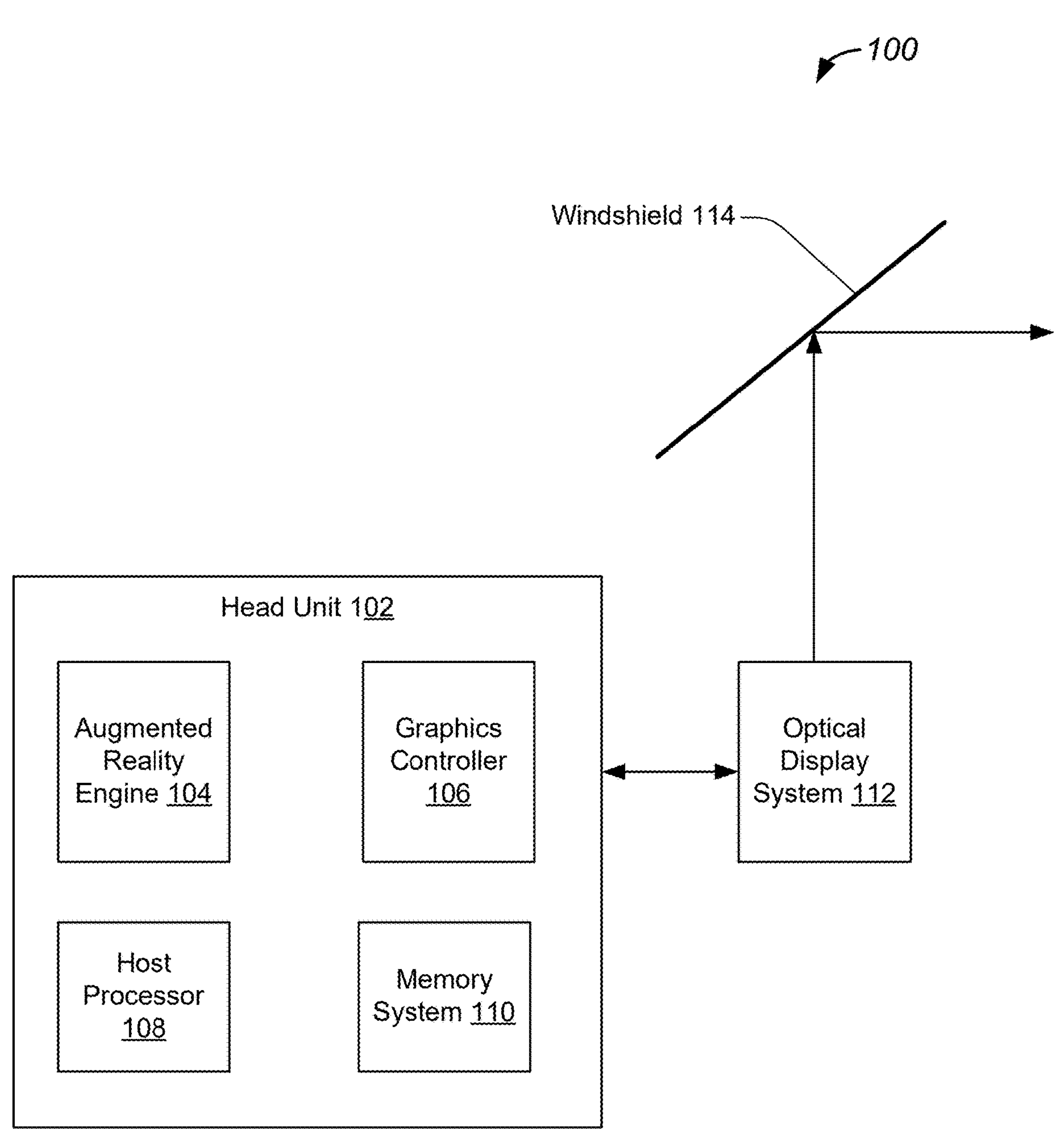
FIG. 1 illustrates an example of a graphics display system, configured in accordance with some embodiments.

FIG. 1 illustrates an example of a graphics display system, configured in accordance with some embodiments. As similarly discussed above, video content may be generated and processed for display in an automotive environment. For example, video content may be generated for a heads-up display, and warping operations may be performed to compensate for surface geometries and reflection angles that might affect how such video content is presented to a user. As will be discussed in greater detail below, a system, such as system 100, may be configured to generate and display such visual content while reducing the incidence of artifacts, such as screen tearing.

System 100 may include head unit 102 which may be included in an automobile. Accordingly, head unit 102 may be an infotainment system of such an automobile, and may support various applications for the automobile. Accordingly, head unit 102 may include host processor 108 configured to execute operations for such applications, as well as memory system 110 configured to store data associated with such applications. In various embodiments, such applications may include data to be presented to a user via a heads-up display. Accordingly, application data may be generated that is subsequently rendered by other components of head unit 102 to create a video output that is ultimately displayed in a heads-up display.

In various embodiments, head unit 102 further includes augmented reality engine 104 which is configured to generate one or more layers of graphical data to be presented in the heads-up display. Accordingly, augmented reality engine 104 is configured to generate different layers of graphics data that may be included in video frames, and may generate such graphics data based on augmented reality parameters configured to simulate three-dimensional depth in the image. In various embodiments, such augmented reality parameters may be configured to set parallax between images based on a simulated image distance, and such parameters may have been determined by an entity, such as a manufacturer during a design process. Such parameters may be stored within head unit 102 and used by augmented reality engine 104.

Head unit 102 additionally includes graphics controller 106 which is configured to render the received graphics data and generate an output capable of being displayed by optical display system 112. As will be discussed in greater detail below, graphics controller 106 may be configured to use a single video buffer for received video frames, thus allowing low-memory modes of operation. Moreover, graphics controller 106 may be configured to maintain input and output synchronization to ensure relatively low latency of the video output, and reduce the incidence of video artifacts, such as screen tearing. In this way, low-memory modes of operation are supported by graphics controller 106 even when warping operations are performed for the heads-up display. In various embodiments, graphics controller 106 may be implemented using a dedicated processing device that may include one or more processors and memory configured to implement components of graphics controller 106. In some embodiments, graphics controller 106 may be implemented by host processor 108 and memory system 110.

In various embodiments the heads-up display may be a reflected image presented to a user via a reflective surface, such as windshield 114. Accordingly, the heads-up display may refer to the reflected image itself, which may be generated by an output of optical display system 112. Accordingly, optical display system 112 may include one or more processors configured to receive the output of head unit 102, and project the output via a projection system that may include a lens and a light source. In this way, optical display system 112 may receive the output of head unit 102 and may project the rendered visual content onto a reflective surface, such as windshield 114. The reflected image may then be viewed by a user at an appropriate viewing position, such as from a seat of the automobile.

Figure 2:
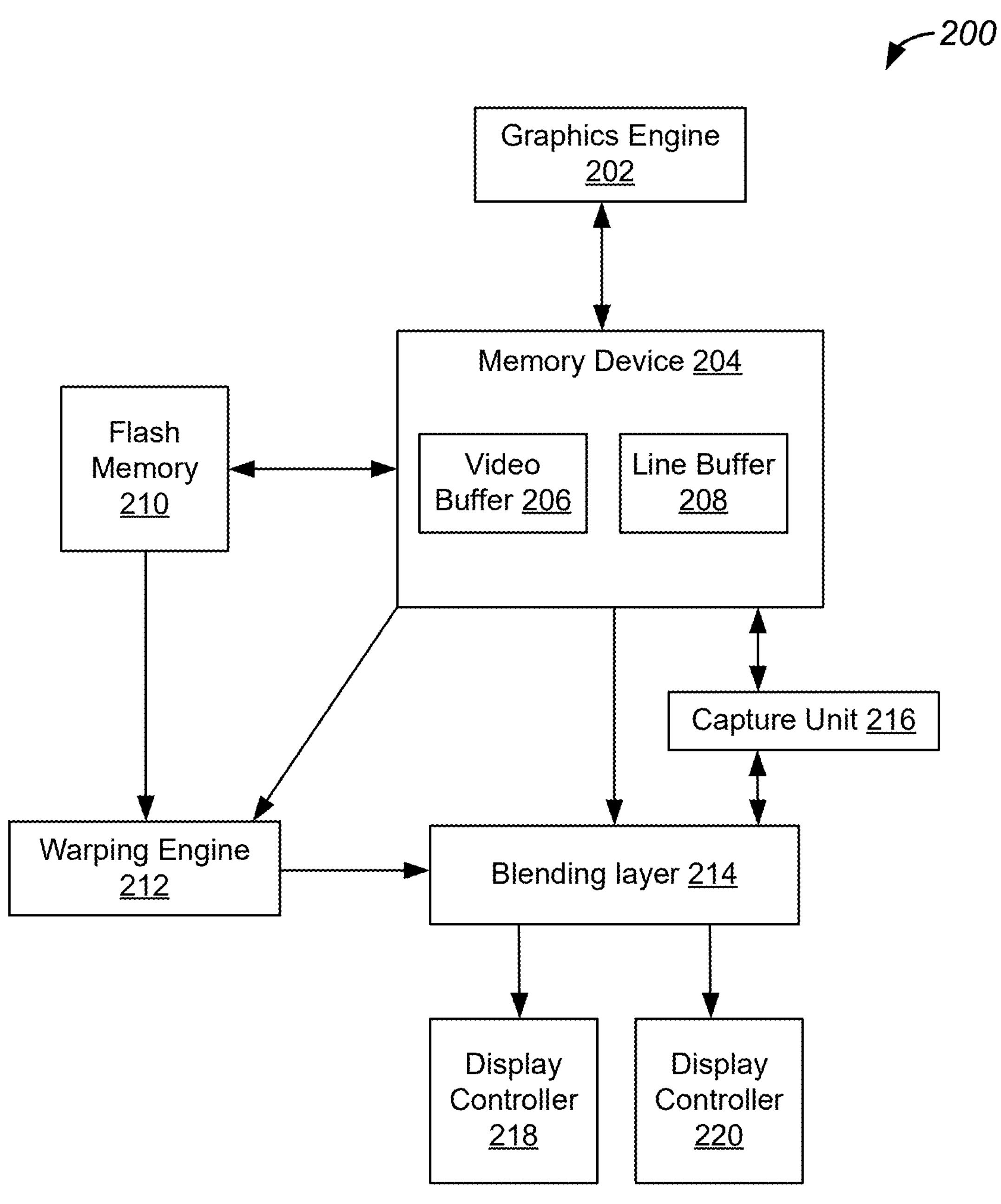
FIG. 2 illustrates an example of a device for generating video content, configured in accordance with some embodiments.

FIG. 2 illustrates an example of a device for generating video content, configured in accordance with some embodiments. As similarly discussed above, warping operations may be performed to compensate for surface geometries and reflection angles that might affect how visual content is presented to a user. As will be discussed in greater detail below, a device, such as device 200, may be configured to perform warping operations and generate visual content while reducing the incidence of artifacts, such as screen tearing.

In various embodiments, device 200 includes graphics engine 202 which is configured to perform two-dimensional raster graphics operations. For example, graphics engine 202 may be a blit engine configured to generate an output pixel image based on one or more bitmaps. More specifically, the blit engine may be configured to perform pixel mapping operations based on one or more designated mappings that may have been previously stored by an entity, such as a manufacturer. In this way, input data may be mapped to output pixels based on such mappings. As disclosed herein, such mappings and warping maps may be stored in memory, such as memory device 204 or an internal memory of graphics engine 202. Accordingly, graphics engine 202 may be communicatively coupled to memory device 204, and may receive graphics data from memory device 204. Graphics engine 202 may perform rendering operations upon the graphics data and return the rendered data to memory device 204 for use by downstream components.

In various embodiments, graphics engine 202 may be configured to support line-based rendering to render graphics line data that may be obtained a current display line of display controller 218 or display controller 220 as well as an availability of a memory line of line buffer 208. Accordingly, line buffer 208 may include a memory line index referred to herein as a K line that represents upcoming graphics line data to be displayed in the future. Line buffer 208 may also include a memory line index referred to herein as an L line that represents old graphics line data associated with previous video data. Line buffer 208 may be configured to make available line memory once the old graphics line data in line buffer 208 has expired as may occur after use by downstream components. Graphic engine 202 may then perform line-based rendering operations upon the graphics data to render graphics line data having a K line offset before a current display line, and may return the rendered line data to line buffer 208 for use by downstream components.

Device 200 further includes memory device 204 which is configured to store graphics data used by other components of device 200. More specifically, memory device 204 may be configured to include video buffer 206 and line buffer 208. As will be discussed in greater detail below, the usage of video buffer 206 and line buffer 208 may be configured to maintain synchronicity between a video-in timing and a video-out timing. In this way, a latency between the video-in timing and the video-out timing may be kept within one video frame. Moreover, usage of video buffer 206 may be configured such that a single video buffer may be used for buffering of the received video data.

For example, video buffer 206 may be configured to receive visual data that may be video data that includes a video frame. The video frame may be written into video buffer 206 progressively. Video data may also be read out progressively from video buffer 206 to graphics engine 202. Accordingly, video data for a first video frame may be stored in video buffer 206 progressively, and a current line being read out may be identified by a current read position. Moreover, video data for a second video frame may be stored in video buffer 206 progressively after the first video frame and as space in video buffer 206 becomes available. Accordingly, a currently line being written may be identified by a current write position. It will be appreciated that while the visual data may include video frames, static images may also be included in such visual data.

In various embodiments, video buffer 206 is configured to operate with the graphics data source, which may be capture unit 216, as well as the graphics data sink, which may be graphics engine 202, to ensure that the timing of the read operation and the write operation are synchronous. Moreover, video buffer 206 may be configured to maintain a first offset value between their two respective positions. The offset value may be a designated number of lines that separate the current read position and the current write position.

As will be discussed in greater detail below, a current line of video input data may be an Nth line. Video buffer 206 may receive the Nth line of video input data. Moreover, a current dispay line may be a Dth line. As discussed above, graphics engine 202 may render a (D+K)th line data to and provide the rendered result to line buffer 208. In some embodiments, video buffer 206 is the source of graphics data for the rendered line data. More specifically, video buffer 206 may read out the (D+M)th line of video data from graphics engine 202 for line-based rendering in order to render the graphics line data for the (D+K)th line to line buffer 208. As described above, the display line of a display controller may be the same as the video input line of capture unit 216, such that D=N. Video buffer 206 may receive an Nth line of video data and may read out the (N+M)th line video data. Accordingly, an offset Mth line between read and write of video data at video buffer 206 may be maintained. In various embodiments, M may be larger than K, and the M line may identify a line that is an input of graphic engine 202, and the K line may identify a line that is an output of graphics engine 202, which may have an internal line buffer.

Memory device 204 may also include line buffer 208 which is configured to receive rendered data from graphics engine 202 and provide an output to a downstream component such as warping engine 212. Accordingly, graphics engine 202 may read a video frame progressively from video buffer 206, and may store the rendered result in line buffer 208. As will be discussed in greater detail below, line buffer 208 may be configured to store a line index, such as a K line, that represents a memory line at which upcoming graphics line data begins, and also include a line index, such as an L line, that represents a memory line at which previous graphics line data begins. More specifically, line buffer 208 may store display line data from (D-L)th line to (D+K)th line as display graphics line data. Line buffer 208 may read from warping engine 212 based on a warping map for the current display line Dth.

In various embodiments, the output of line buffer 208 is not progressive, and the entire video frame is provided to graphics engine 202 at once. Moreover, the output of line buffer 208 is coordinated with the input to video buffer 206 such that a rendered first video frame is provided to warping engine 212 synchronously with a second video frame starting to be received at line buffer 208. In some embodiments, a second offset value may be implemented between a write operation from graphics engine 202 to line buffer 208, and the output operation of line buffer 208. Thus a first write operation for the second video frame at video buffer 206 may be performed synchronously with line buffer 208 providing the rendered first video frame to warping engine 212, and a latency between reception of a video frame and its output may be kept within a video frame.

As discussed above, device 200 additionally includes warping engine 212 which is configured to perform warping operations based on a warping map that may be stored in, for example, flash memory 210. Accordingly, warping engine 212 may receive graphics data from memory device 204, and may perform warping operations on-the-fly based on one or more transformations identified by the warping map. Such warping operations may include changes to dimensions, proportions, and orientations of video data that are configured to counteract distortions caused by a reflection off of a surface, such as a windshield. Such operations may have been determined by a manufacturer during a design and calibration process, and may have been stored as the warping map in flash memory 210. Accordingly, warping engine 212 may receive graphics data, perform warping operations, and provide an output to blending layer 214.

In various embodiments, blending layer 214 is configured to blend multiple layers of graphics data into a single layer for display by a downstream component. Accordingly, blending layer 214 may combine layers included in the graphics data into flattened graphics data, and may provide the output to one or more display controllers, such as display controller 218 and display controller 220. As will be discussed in greater detail below, display controller 218 and display controller 220 may be separate display pipelines for different display outputs that are each configured to include frame generators configured to generate video frames for their respective target displays. Accordingly, the rendered and warped graphics data may be packaged as a video frame by, for example, display controller 218. In one example, display controller 218 may be unused or may provide an output to an instrument cluster for other video data during other video rendering operations, and display controller 220 may provide an output to a downstream component, such as an optical display system. Display controller 218 or display controller 220 may be configured to synchronize the timing of video input frames of capture unit 216. The display line of a display controller may be same as the video input line of capture unit 216. Accordingly, the period of each horizontal display line of a display controller may be runtime adjusted to follow that of a video capture line.

Device 200 further includes capture unit 216 which is configured to receive graphics data that may include video frames. Accordingly, graphics data generated and received from other system components, such as a host processor, may provide such graphics data to capture unit 216, and capture unit 216 may be configured to receive such graphics data and extract video frames for use by other components of device 200. For example, capture unit 216 may provide graphics data to memory device 204 and blending layer 214.

Figure 3:
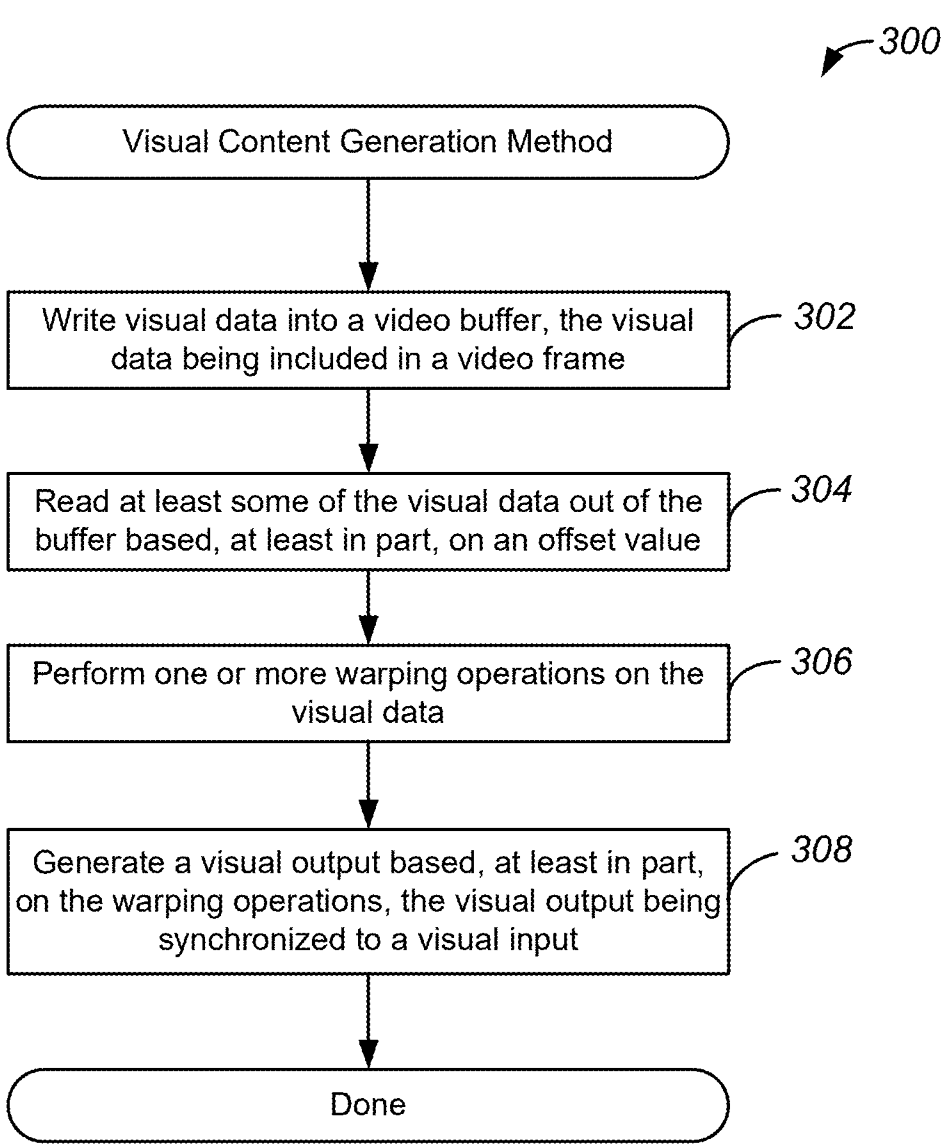
FIG. 3 illustrates an example of a method for generating video content, performed in accordance with some embodiments.

FIG. 3 illustrates an example of a method for generating video content, performed in accordance with some embodiments. As similarly discussed above, video content may be generated and processed for display in an automotive environment. As will be discussed in greater detail below, a method, such as method 300, may be performed to generate and display such video content while reducing the incidence of artifacts, such as screen tearing.

Method 300 may perform operation 302 during which visual data may be written into a video buffer, the visual data being included in a video frame. Accordingly, as similarly discussed above, visual data included in a video frame may be received by a capture unit, and may be written to a component of a memory device, such as a video buffer.

Method 300 may perform operation 304 during which at least some of the visual data may be read out of the buffer based, at least in part, on an offset value. Accordingly, the visual data may then be read out of the video buffer to, for example, a graphics engine, and in accordance with an offset value. As similarly discussed above, the offset value may maintain a designated line offset between a current read position and a current write position of the visual data that is progressively written to and progressively read from the video buffer.

Method 300 may perform operation 306 during which one or more rendering operations may be performed on the visual data. Thus, the graphics engine may perform rendering operations on the visual data received from the video buffer, and may provide the rendered visual data to a downstream component, such as a line buffer. The line buffer may store the rendered visual data until accessed by a downstream component, such as a warping engine.

Method 300 may perform operation 308 during which a visual output may be generated based, at least in part, on the warping operations, the visual output being synchronized to a visual input. Accordingly, the output of the warping engine may generate rendered and warped visual data, and a display controller may generate a frame that is provided to a display system for display in a heads-up display. In various embodiments, a timing of the output of the display controller may be synchronized with a timing of the capture unit receiving visual data. In this way, synchronicity between the received visual data and the output frame may be maintained while ensuring latency is within one frame.

Figure 4:
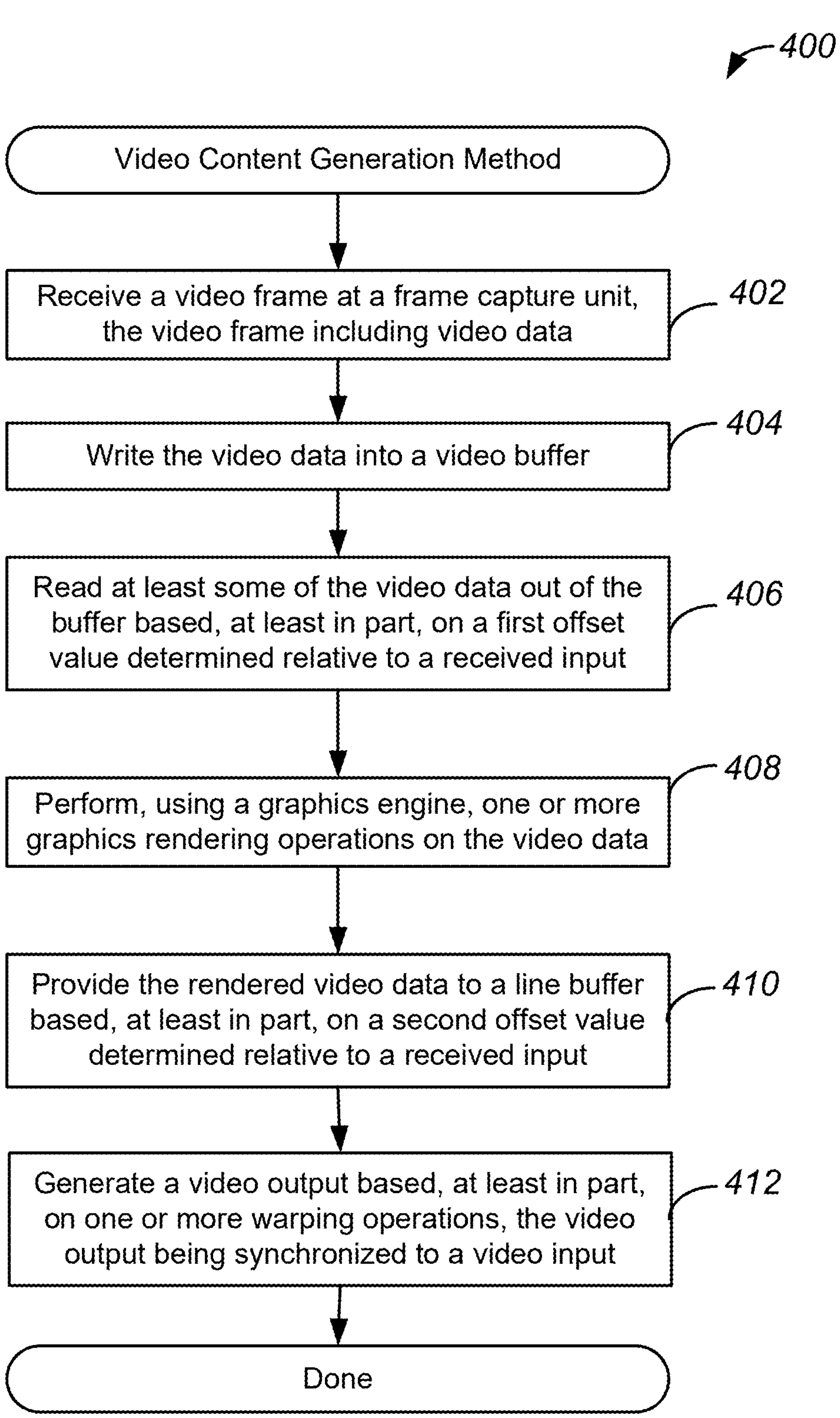
FIG. 4 illustrates another example of a method for generating video content, performed in accordance with some embodiments.

FIG. 4 illustrates another example of a method for generating video content, performed in accordance with some embodiments. As similarly discussed above, video content may be generated and processed for display in an automotive environment. As will be discussed in greater detail below, a method, such as method 400, may be performed to generate and display such video content while maintaining relatively small latency and reducing the incidence of artifacts, such as screen tearing.

Method 400 may perform operation 402 during which a video frame may be received at a frame capture unit, the video frame including video data. As similarly discussed above, a capture unit may be configured to receive video data generated by one or more other system components. For example, an application executed by a head unit of an automobile may generate video data for display in a heads-up display of an automobile. The video data may include information such as navigation information, distance information, and/or other diagnostic system information. In some embodiments, the video data may also include distance information that may be used to simulate three-dimensional distance of graphical elements included in the video data. Such video data may be packaged in video frames and streamed to a capture unit.

Method 400 may perform operation 404 during which the video data may be written into a video buffer. Accordingly, as similarly discussed above, the video data included in the video frame may be received by a capture unit, and the capture unit may write the video frame to a component of a memory device, such as a video buffer. The writing of the video frame may be performed progressively and line-by-line.

Method 400 may perform operation 406 during which at least some of the video data may be read out of the video buffer based, at least in part, on a first offset value determined relative to a received input. Accordingly, the video data may then be read out of the video buffer to, for example, a graphics engine, and in accordance with the first offset value. As similarly discussed above, the first offset value may maintain a designated line offset between a current read position and a current write position of the video data that is progressively written to and progressively read from the video buffer. In this way, synchronicity and a designated first offset value may be maintained while data is written into and read out of the video buffer.

Method 400 may perform operation 408 during which one or more graphics rendering operations may be performed on the video data. Accordingly, the graphics engine may perform rendering operations on the video data received from the video buffer. As similarly discussed above, the graphics engine may be a blit engine that may perform bitmap combination operations and/or other rendering operations to generate rendered pixel information.

Method 400 may perform operation 410 during which the rendered video data may be provided to a line buffer based, at least in part, on a second offset value determined relative to a received input. Accordingly, the second offset value may maintain synchronicity between an output of the line buffer and an input to the video buffer such that the output of a first video frame from the line buffer is synchronous with the commencement of the reception of a second video frame at the video buffer.

Method 400 may perform operation 412 during which a video output may be generated based, at least in part, on one or more warping operations, the video output being synchronized to a video input. Accordingly, the output of the warping engine may generate rendered and warped video data, and a display controller may generate a video frame that is provided to a display system for display in a heads-up display. In various embodiments, a timing of the output of the display controller may be synchronized with a timing of the capture unit receiving video data. In this way, synchronicity between the received video data and the output video frame may be maintained while ensuring latency is within one video frame.

Figure 5:
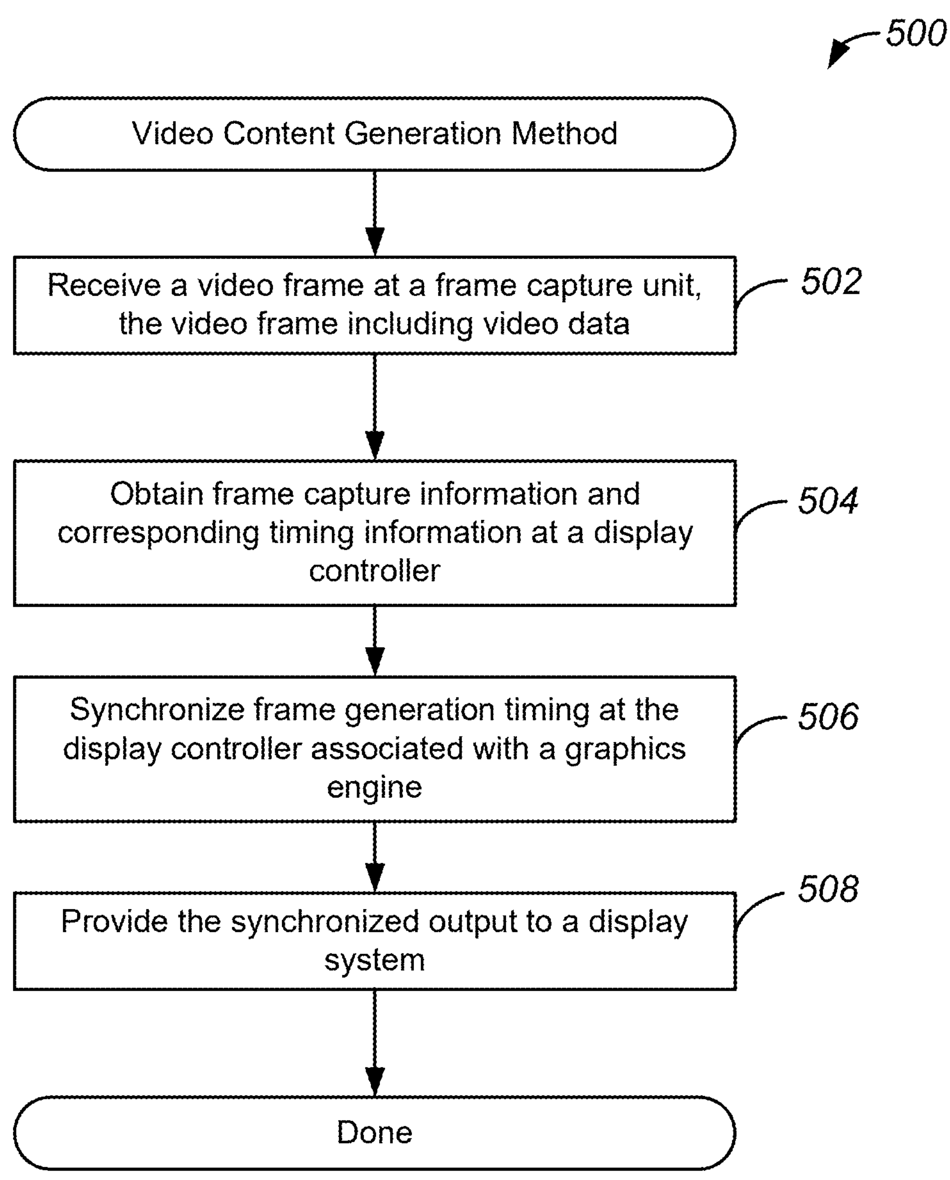
FIG. 5 illustrates yet another example of a method for generating video content, performed in accordance with some embodiments.

FIG. 5 illustrates yet another example of a method for generating video content, performed in accordance with some embodiments. As similarly discussed above, video content may be generated and processed for display in an automotive environment. As will be discussed in greater detail below, a method, such as method 500, may be performed to perform synchronization operations for the display of such video content.

Method 500 may perform operation 502 during which a video frame may be received at a frame capture unit, the video frame including video data. As similarly discussed above, a capture unit may be configured to receive video data generated by one or more other system components. Such video data may be packaged in video frames and streamed to a capture unit.

Method 500 may perform operation 504 during which frame capture information and corresponding timing information may be obtained by a display controller. In various embodiments, the frame capture information and corresponding timing information may identify timing information for when the video frame is received at the capture unit. Accordingly, the display controller may receive such information from the capture unit and obtain such timing information.

Method 500 may perform operation 506 during which frame generation timing may be synchronized at the display controller associated with a graphics engine. Accordingly, the obtained timing information may be used to synchronize activity of a frame generator included in the display controller. More specifically, a timing at which an output is generated by the frame generator may be synchronized such that it is synchronous with the capture unit receiving a video frame.

Method 500 may perform operation 508 during which a synchronized output may be provided to a display system. Accordingly, the output that may include rendered and warped video data, may be provided to a display system for projection in a heads-up display. As discussed above, the output may be synchronized and provided in accordance with the previously discussed timing information. In this way, synchronicity between the receiving and output of video data may be maintained to ensure artifacts, such as screen tearing, are reduced while also ensuring that latency is relatively small, and in a manner also compatible with a low-memory mode, such as a capture-to-display mode.

Figure 6:
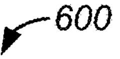
FIG. 6 illustrates a block diagram representing an example of a video buffer implementation, configured in accordance with some embodiments.
Figure 6:
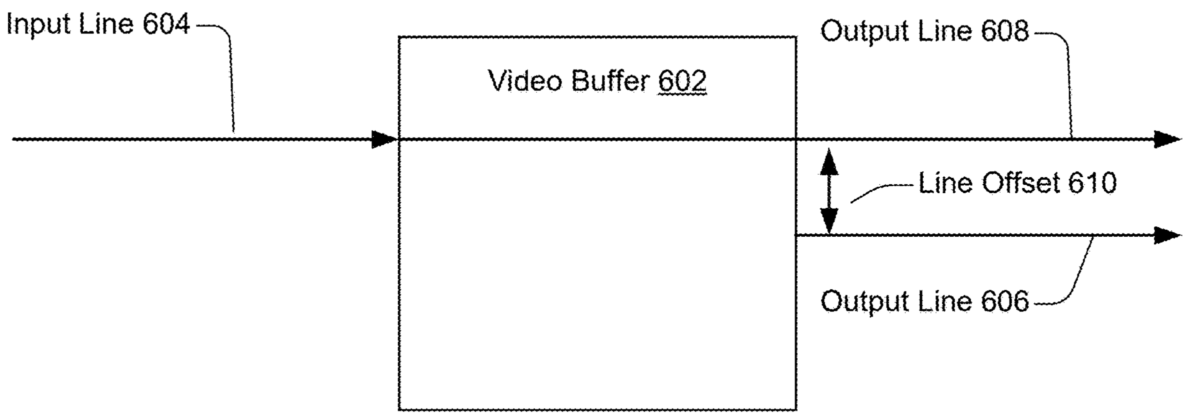

FIG. 6 illustrates a block diagram representing an example of a video buffer implementation, configured in accordance with some embodiments. As discussed above, warping operations may be performed to compensate for surface geometries and reflection angles that might affect how visual content is presented to a user. As shown in image 600, a video buffer, such a video buffer 602, may be used to store lines of graphics data. Moreover, an offset, such as line offset 610, may be used to manage a timing of video data output to downstream components, such as a warping engine.

For example, input line 604 may represent a received line of input video data stored at an Nth line of video buffer 602. The input video data may include input pixel data received from a video source. Such data may be written progressively into video buffer 602 in a line-by-line manner. Accordingly, lines above the Nth line within video buffer 602 may store lines of data for newly received data, such as a newly and most recently received video frame. Lines below the Nth line may store previously received video data for a previous video frame.

Data may also be read out of video buffer 602 in a manner that is synchronized to the video input timing. Accordingly, output line 608 may represent an Nth line of video data that may be read out to a downstream component such as a display controller, where such video output timing may be synchronized to the video input timing. Moreover, output line 606 may represent an output provided to another component, such as a graphics engine, where output line 606 has line offset 610 between output line 606 and the Nth line. As discussed above, line offset 610 may be referred to herein as an M line. Accordingly, output line 606 may be an (N+M)th line. As will be discussed in greater detail below, use of line offset 610 an the size of M line may be configured to facilitate on-the-fly warping operations.

Figure 7:
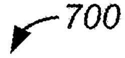
FIG. 7 illustrates a block diagram representing an example of a video buffer and line buffer implementation, configured in accordance with some embodiments.
Figure 7:
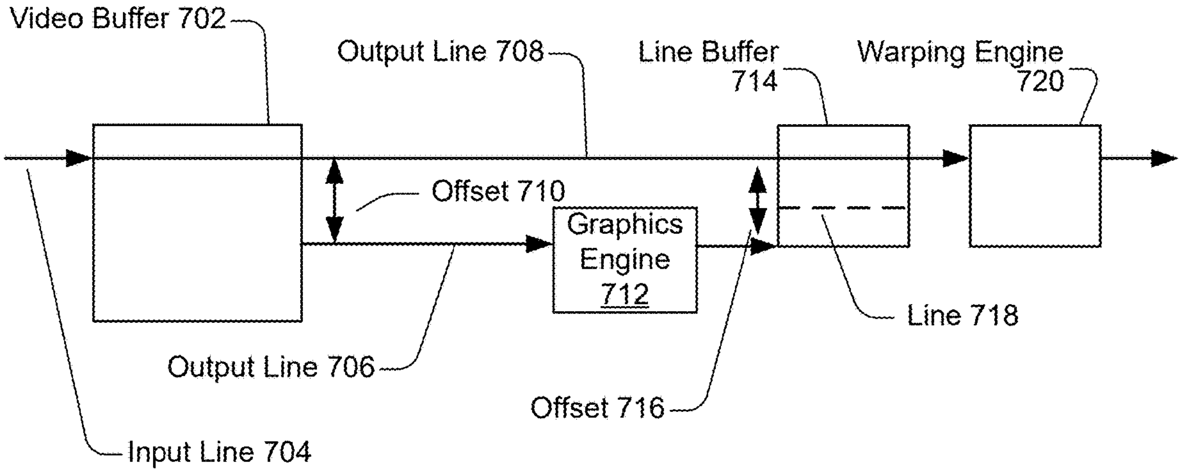

FIG. 7 illustrates a block diagram representing an example of a video buffer and line buffer implementation, configured in accordance with some embodiments. As discussed above, warping operations may be performed to compensate for surface geometries and reflection angles that might affect how visual content is presented to a user. As shown in image 700, a video buffer, such a video buffer 702, may be used to store lines of graphics data, and other components, such as graphics engine 712 and line buffer 714, may be configured to facilitate the implementation of warping operations.

As similarly discussed above, video buffer 702 may received input video data at input line 704, and such data may be stored at an Nth line of video buffer 702. Moreover, data may be read out of video buffer 702 at output line 706 and output line 708 where offset 710 is implemented between them. As similarly discussed above, offset 710 may be an M line. As shown in image 700, output line 706 may be provided to graphics engine 712. As discussed above, graphics engine 712 may include a blit engine. In various embodiments, the blit engine may be configured to implement an on-the-fly (OTF) warping window mode where the blit engine may be interconnected with a video input/output core and may be configured to receive display line timing information for the display controller and HUD display. Because the blit engine knows such timing information, it may be configured to render content in advance and store such rendered content in line buffer 714. In this way, an (N+M)th line may be provided to graphics engine 712, and graphics engine 712 may render the received line in advance (prior to output to the HUD), and store the rendered line in line buffer 714 for subsequent use by the warping engine.

As shown in image 700, line buffer 714 is configured to implement line 718 which may be a keepline. In various embodiments, display content stored at the keepline is read by warping engine 720 in accordance to a warping map that may have been previously stored in location such as a coordinate buffer. Accordingly, the keepline may be used to identify what lines should be read by warping engine 720. In various embodiments, an output of warping engine 720 is provided to a blending layer and then output to the HUD. In some embodiments, the output of line buffer 714 is non-sequential, and lines identified by keepline (above line 718) may be fetched with a non-sequential read operation.

Figure 8:
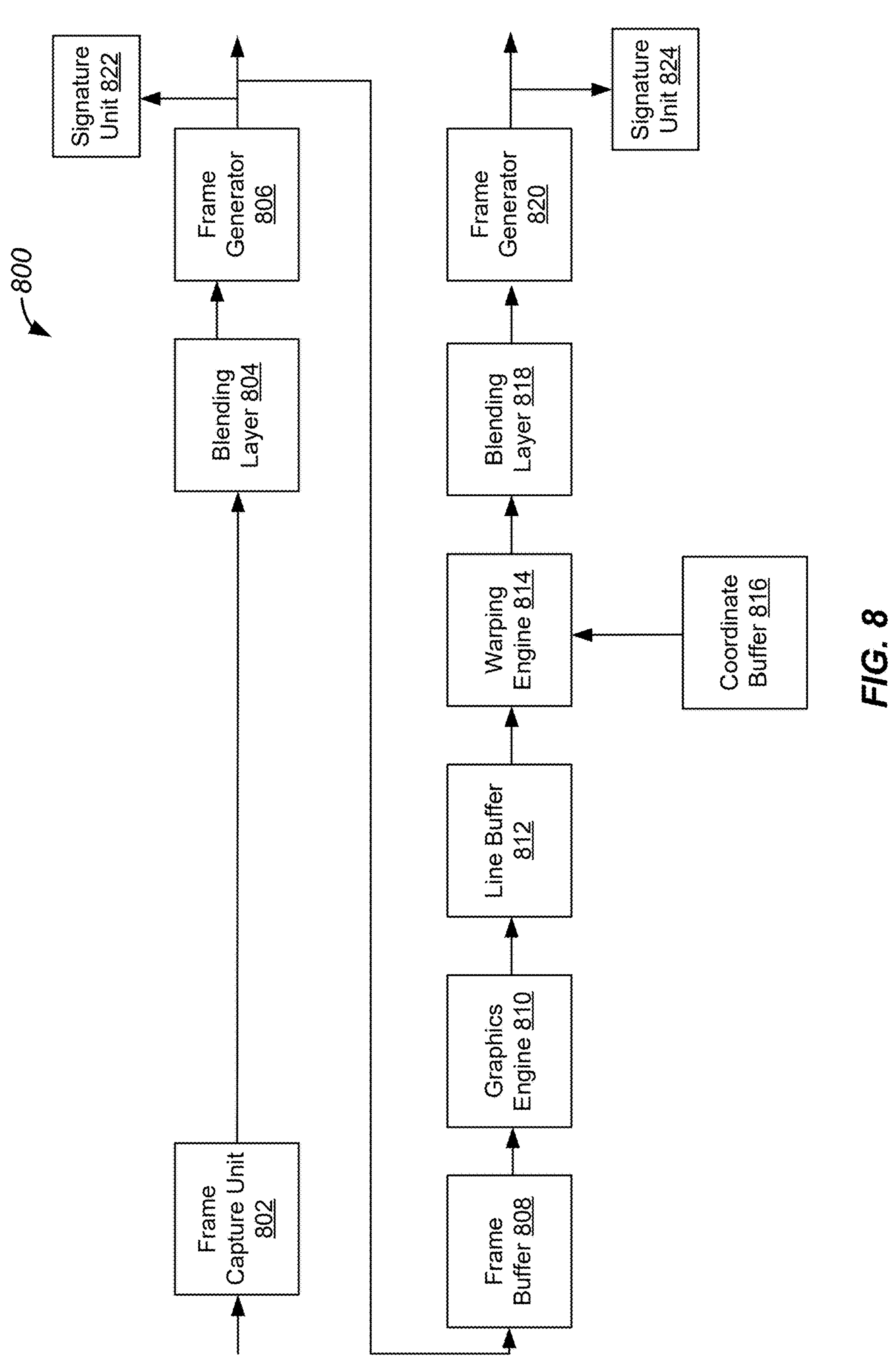
FIG. 8 illustrates a block diagram representing another example of a video buffer and line buffer implementation, configured in accordance with some embodiments.

FIG. 8 illustrates a block diagram representing another example of a video buffer and line buffer implementation, configured in accordance with some embodiments. As discussed above, input and output timings may be synchronized to facilitate implementations graphics rendering and warping operations. Accordingly, as will be discussed in greater detail below, incorporation of such graphics rendering operations and warping operations enables on-the-fly rendering and warping as disclosed herein.

In various embodiments, visual data may be received from a source at frame capture unit 802. Frame capture unit 802 may provide such received visual data to blending layer which may provide an output to frame generator 806 configured to generate output video frames for a first video output. In various embodiments, frame generator 806 also generates a first display timing. In this example, the first video output may be from a first display controller that includes frame generator 806, and the first video output might be reserved and not used. In various embodiments, a synchronization operation may be configured to synchronize a timing between frame capture unit 802 and frame generator.

In some embodiments, an output of frame generator 806 may be provided to an input of a frame storage location that may include frame buffer 808. In various embodiments, frame buffer 808 may be configured as a video buffer discussed above, and may provide an output to graphics engine 810, as similarly discussed above. Graphics engine 810 may render received content and provide the rendered content to line buffer 812. As also discussed above, line buffer 812 may provide an output to warping engine 814 which may perform warping operations based on a warping map that may be stored in coordinate buffer 816. The output of warping engine 814 may be provided to blending layer 818 that may provide an output to frame generator 820. Frame generator 820 may generator a second video output having a second display timing. Accordingly, frame generator 820 may be included in a second display controller that is used to provide display data to a HUD. In various embodiments, signature unit 822 and signature unit 824 may also be included to perform cyclic redundancy check (CRC) operations on the video outputs. In this way, verification components may be included to ensure visual artifacts are not present in the video outputs.

In various embodiments, timings of frame generator 806 and frame generator 820 may be synchronized. For example, a periodic synchronization may be implemented using a timing signal or frame start pulse. When combined with the synchronization between frame capture unit 802 and frame generator 806, the display output provided to the HUD via frame generator 820 is synchronized with frame capture unit 802. Moreover, an offset between output data provided to frame generator 820 and input data received at frame buffer 808 is maintained via use of the offsets discussed above and a handshake operation between graphics engine 810 and frame generator 820. In this way, such an offset may be maintained and used to facilitate advanced rendering of content to enable on-the-fly warping of such pre-rendered content.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:

receiving, at a video buffer, a video input comprising video data, the video data being included in a video frame;

reading at least some of the video data out of the video buffer to a graphics engine based, at least in part, on a first offset value determined based on timing information associated with the graphics engine, the first offset value being a distance between a current input line of the video buffer and a designated output line of the video buffer provided to the graphics engine;

performing, using one or more processors, one or more graphics rendering operations on the video data;

writing rendered video data to a line buffer based, at least in part, on a second offset value configured to synchronize the video input of the video buffer and an output of the line buffer; and generating a video output based, at least in part, on one or more warping operations, the video output being synchronous with the video input.

2. The method of claim 1, wherein the first offset value is determined based on a current read position and a current write position associated with the video buffer.

3. The method of claim 2, wherein the second offset value is determined based on a current write position associated with the video buffer and a current write position associated with the line buffer.

4. The method of claim 1 further comprising:

synchronizing frame generation of a display controller with the receiving of the video input.

5. The method of claim 1, wherein the one or more warping operations are performed on-the-fly.

6. The method of claim 1, wherein the one or more warping operations are performed based on a designated warping map configured based on an interior of an automobile.

7. The method of claim 2, wherein the video output is provided to a heads-up display of an automobile.

8. The method of claim 1, wherein the one or more graphics rendering operations are performed by a blit engine.

9. The method of claim 1, wherein the generating of the video output further comprises:

generating a video frame based on rendered and warped video data.

10. A system comprising:

a memory comprising:

a video buffer configured to receive a video input comprising video data, the video data being included in a video frame; and a line buffer; and a graphics controller comprising one or more processors configured to:

read at least some of the video data out of the video buffer to a graphics engine based, at least in part, on a first offset value determined based on timing information associated with the graphics engine, the first offset value being a distance between a current input line of the video buffer and a designated output line of the video buffer provided to the graphics engine;

performing one or more graphics rendering operations on the video data;

writing rendered video data to the line buffer based, at least in part, on a second offset value configured to synchronize the video input of the video buffer and an output of the line buffer; and generate a video output based, at least in part, on one or more warping operations, the video output being synchronous with the video input.

11. The system of claim 10, wherein the first offset value is determined based on a current read position and a current write position associated with the video buffer.

12. The system of claim 11, wherein the second offset value is determined based on a current write position associated with the video buffer and a current write position associated with the line buffer.

13. The system of claim 10, wherein the one or more processors are further configured to:

synchronize frame generation of a display controller with the receiving of the video input.

14. The system of claim 10, wherein the one or more warping operations are performed based on a designated warping map configured based on an interior of an automobile.

15. The system of claim 10, wherein the one or more graphics rendering operations are performed by a blit engine.

16. A device comprising:

a video buffer configured to receive a video input comprising video data, the video data being included in a video frame;

a line buffer; and one or more processors configured to:

read at least some of the video data out of the video buffer to a graphics engine based, at least in part, on a first offset value determined based on timing information associated with the graphics engine, the first offset value being a distance between a current input line of the video buffer and a designated output line of the video buffer provided to a graphics engine;

performing one or more graphics rendering operations on the video data;

writing rendered video data to the line buffer based, at least in part, on a second offset value configured to synchronize the video input of the video buffer and an output of the line buffer; and generate a video output based, at least in part, on one or more warping operations, the video output being synchronous with the video input.

17. The device of claim 16, wherein the first offset value is determined based on a current read position and a current write position associated with the video buffer.

18. The device of claim 17, wherein the second offset value is determined based on a current write position associated with the video buffer and a current write position associated with the line buffer.

19. The device of claim 16, wherein the one or more processors are further configured to:

synchronize frame generation of a display controller with the receiving of the video input.

20. The device of claim 16, wherein the one or more warping operations are performed based on a designated warping map configured based on an interior of an automobile.

* * * * *